United States Patent [19]

Sherif

[11] Patent Number: 5,023,071

[45] Date of Patent: Jun. 11, 1991

[54] PROCESS FOR FORMING METAL OXIDE POWDERS FROM THE METAL ALKOXIDE

[75] Inventor: Fawzy G. Sherif, Stony Point, N.Y.

[73] Assignee: Akzo America Inc., New York, N.Y.

[21] Appl. No.: 517,459

[22] Filed: Apr. 30, 1990

Related U.S. Application Data

[63] Continuation of Ser. No. 253,300, Oct. 5, 1988, abandoned.

[51] Int. Cl.$^5$ ............................................. C01B 13/32
[52] U.S. Cl. ................................. 423/592; 423/339; 423/593; 423/598; 423/600; 423/608; 423/625; 423/636; 427/34
[58] Field of Search ............... 423/592, 593, 600, 339, 423/598, 608, 625, 636

[56] References Cited

U.S. PATENT DOCUMENTS

| | | | |
|---|---|---|---|
| 4,619,908 | 10/1986 | Cheng et al. | 423/338 |
| 4,636,248 | 1/1987 | Ogata et al. | 423/593 |
| 4,732,750 | 3/1988 | Olson et al. | 423/610 |

FOREIGN PATENT DOCUMENTS

| | | |
|---|---|---|
| 225785 | 6/1987 | European Pat. Off. |
| 158116 | 7/1987 | Japan |
| 2168334 | 6/1986 | United Kingdom |

OTHER PUBLICATIONS

Chemical Abstracts 108:58827g (1988).
Chemical Abstracts 104:134796p (1986).

*Primary Examiner*—Wayne A. Langel
*Attorney, Agent, or Firm*—Richard P. Fennelly; Louis A. Morris

[57] ABSTRACT

Metal oxide powders, which are chemically uniform and free-flowing, can be formed by dissolving a metal alkoxide in a non-polar organic solvent, adding water to the resulting composition and then emulsifying the blend of water and solvent containing the alkoxide to cause hydrolysis of the alkoxide. The hydrolysis reaction forms the desired metal oxide as a precipitate which can be recovered by a simple filtration process.

7 Claims, No Drawings

PROCESS FOR FORMING METAL OXIDE POWDERS FROM THE METAL ALKOXIDE

This is a continuation of application Ser. No. 253,300 filed Oct. 5, 1988, now abandoned.

BACKGROUND OF THE INVENTION

The present invention relates to the formation of metal oxides, useful in ceramic applications, from the corresponding metal alkoxide by a hydrolysis reaction.

DESCRIPTION OF THE PRIOR ART

It is known to form metal oxide powders from the inorganic metal salts by forming an aqueous solution containing the inorganic metal salt and adding it to an emulsion comprising a non-polar organic solvent, such as toluene, an emulsifier and an amine precipitating base. (See M. Akine et al., "Prepartion of Yttria Powders by Emulsion Precipitation", Advances in Ceramics, Vol. 21: Ceramic Powder Science, pp. 57–67 (1987)). Due to the differences in the densities of the differing salts, differential settling may occur prior to precipitation thereby giving rise of inhomogeneity.

Another general technique which is known to the art involves dissolving a metal alkoxide in a polar organic solvent, e.g., an alcohol, and adding water to cause hydrolysis of the alkoxide to the desired metal oxide. This approach is shown in European Patent Publication Nos. 177,198 and 263,544. Generally speaking, such a technique will yield a metal oxide product in particulate form having pour flow and density. Such a product is not very suitable for certain ceramics applications, e.g., as a material intended for use as a plasma spray coating. Because of the rapid contact between water and alkoxide, agglomeration of the product may occur.

It is also known to form aerosol gels by hydrolyzing metal alkoxides dissolved in volatile solvents (a mixture of polar and non-polar solvents) using water (see French Patent Publication No. 2,050,725). This technique uses autoclaving, an energy intensive process, to separate the product.

SUMMARY OF THE PRESENT INVENTION

The present invention relates to a novel process for forming metal oxide powders from the corresponding metal alkoxide. It comprises first dissolving the alkoxide in a non-polar organic solvent followed by addition of water and the formation of an emulsion. The water brings about hydrolysis of the metal alkoxide forming a metal oxide precipitate that can be recovered from the liquid (organic solvent/water) medium.

DETAILED DESCRIPTION OF THE PRESENT INVENTION

The instant process is broadly applicable to formation of metal oxide powders having better flow and density than achievable with the type of process in which a metal alkoxide is hydrolyzed in a polar organic solvent. The alkoxides which can be treated in accordance with the instant process include those of the transition metals of Groups IB-VIIB and VIII of the Periodic Table as well as the metals of Groups IIA and IIIA. Representative examples include the alkoxides of zirconium, yttrium, aluminum, titanium, magnesium, cerium, calcium, strontium, barium, silicon, and mixtures thereof.

The selected alkoxide is dissolved in a non-polar organic solvent such as an aromatic or aliphatic hydrocarbon solvent which is immiscible with water. Representative solvents include toluene, benzene, hexane, cyclohexane, heptane, and mixtures thereof. The purpose in selecting a non-polar, rather than polar, organic solvent for use in the instant invention is to retard the rate of reaction between the alkoxide and water to thereby aid in formation of particles having a higher bulk density and better flow characteristics. The instant procedure yields more spherical and less porous particles due to the absence of a polar solvent which would tend to yield a more gel-like product if used to dissolve the alkoxide reagent for later hydrolysis with water.

After formation of the solution of non-polar organic solvent and metal alkoxide, the desired hydrolysis reaction is initiated by the addition of water and formation of an emulsion. The emulsion can be formed by either subjecting the blend of solvent/alkoxide and water to suitable agitation, by using ultrasonic vibrations, or by addition of a non-ionic surfactant.

The hydrolysis reaction in the instant process, because of the hydrophobic character of the type of organic solvent selected does not proceed as quickly as it would if a polar, rather than non-polar, organic solvent were used. It gives a simple, low temperature approach to forming the desired metal powder product. The instant process enables the use of generally high reaction concentrations and gives high yields to the desired product. The product is easily separated by filtration without the need for washing.

The following invention is further illustrated by the Examples which follow.

EXAMPLE 1

Into a 12 liter, round-bottom flask 2456 gm of zirconium n-propoxide solution in n-propanol (73.6 wt %) were added to 655 gm of yttrium isopropoxide solution in toluene (21.3 wt %). The mixture was refluxed under nitrogen atmosphere for two hours. Then, 850 gm of n-propanol was distilled off. The mixture was cooled down to room temperature.

To the mixture described above was then added 5 liters of toluene for blending with the zirconium and yttrium alkoxides. Water (426 ml) was then added, and the mixture was stirred vigorously for five minutes. A gelatinous semi-transparent precipitate formed. It was removed by filtration and washed with an equivalent volume of toluene. The solid product was dried at 125° C. for three hours, and was heated at 200° C. for two hours, at 425° C. for two hours, and at 800° C. for three hours. The product was classified by sieving to give the fraction smaller than 140 mesh and larger than 325 mesh. The properties of the powder are as follows:

Median Particle Size: 75 microns
Unpacked Bulk Density: 1.07 gm/cc
Flow Rate (ASTM B213-48 [1970]) 1.42 cc/sec
Crystalline Phase: Cubic
Surface Area: 37 $m^2$/gm
Wt % of $Y_2O_3$: 8

The yield of powder before classification was 720 gm, a 97.4% recovery. The yield of the classified desired product was 70% recovery. Thermogravimetric analysis of the calcined product showed a substantially constant weight up to 1000° C., indicating substantial purity for the material and the substantial absence of organic volatile matter. Scanning electron microscopy showed that the particles were composed of uniform grains of 0.2–0.3 micron size with clear and smooth grain boundaries. This is indicative of good densification at the relatively low temperature of 800° C. Such high densification is needed for plasma spraying coating applications. This powder was successfully applied as a coating (having 10–15% porosity by microscopic examination) using a plasma spraying technique.

EXAMPLE 2

This Example is similar to Example 1 except that the final product was calcined further to 1100° C. and held at this temperature for three hours. The properties of the product after classification were:
  Median Particle Size: 75 microns
  Unpacked Bulk Density: 1.79 gm/cc
  Flow Rate: 1.42 cc/sec
  Crystalline Phase: Cubic
  Surface Area: 3.4 m²/gm
  Wt % of $Y_2O_3$: 8

Examination of the microstructure of the product by scanning electron microscope showed that the powder maintained the 0.2–0.3 micron grain size described for the product in Example 1. When the powder was further calcined to 1600° C., the grain size increased to 1–2 microns. The grain boundaries of both the 1100° C. and 1600° C. sintered powders showed no porosity indicating good densification upon sintering.

COMPARATIVE EXAMPLE 3

This Example shows that if the process described in Example 1 is used with n-propanol solvent instead of toluene, the filtered product, after calcination at 800° C., will have poor flow and low density. The properties of the resulting product were:
  Median Particle Size: 22 microns
  Unpacked Bulk Density: 3.67 gm/cc
  Flow Rate: 0.1 cc/sec
  Crystalline Phase: Cubic

COMPARATIVE EXAMPLE 4

This Example illustrates that if the process described in Example 1 is used with n-propanol solvent instead of toluene and the filtered product is spray dried, the resulting product, after calcination at 800° C., will still have poor flow and low density. The properties of the powder are as follows:
  Median Particle Size: 22 microns
  Unpacked Bulk Density: 0.76 gm/cc
  Flow Rate: 0.1 cc/sec
  Crystalline Phase: Cubic

EXAMPLE 5

This Example was performed as in Example 1, except that 750 cc of acetic acid was added to the distilled toluene solution of both the zirconium and yttrium alkoxides. The yield of the desired classified powder product with a median particle size of 75 microns increased to 74% recovery as compared to 70% recovery in Example 1. The unpacked bulk density was 1.75 gm/cc instead of 1.07 gm/cc as in Example 1. This was indicative of high densification.

EXAMPLE 6

This Example is similar to Example 1, except that the water added was emulsified in 2000 cc toluene, using 2 gm of polysorbate 20 polyoxyethylene 20 sorbitan monolaurate (TWEEN 20 brand) and 2 gm of the sodium salt of polymeric 2-methyl-2-propenoic aicd (DAXAD 30 brand) as emulsifying agents. After sonification for thirty seconds, the water emulsion was a milky white, stable viscous liquid composed of fine water particles in toluene. The formed gel was filtered, washed and dried at 125° C. for three hours to give a free flowing powder. After calcination to 800° C. as in Example 1, the bulk density was 1 gm/cc and the flow rate was 0.7 cc/sec. Further calcination to 1100° C. gave a classified powder with a density of 1.24 gm/cc, a flow rate of 1.4 cc/sec, and a mean particle size of 90 microns suitable for plasma spraying.

EXAMPLE 7

This Example is similar to Example 1, except that the product was zirconia toughened alumina (referred to as "ZTA" hereinafter). Aluminum sec-butoxide (386.5 gm) was dissolved in a 23 wt % solids solution of 68.3 gm of zirconium n-butoxide and 16.3 gm of yttrium isopropoxide in 3000 cc of toluene. The solution was mixed in a five liter round-bottom flask under nitrogen gas flow. A milky water emulsion was made from ultrasonification for ten seconds of 96 cc of distilled water, 1 gm of polysorbate 20 polyoxyethylene 20 sorbitan monolaurate (TWEEN 20 brand) emulsifying agent, and 100 cc of toluene. The water emulsion was added to the alkoxide solution while stirring vigorously for two minutes. The hazy mixture was left overnight, then filtered, washed with an equal volume of toluene, and dried at 110° C. The density of the powder was 0.26 gm/cc. The powder was heated to 600° C., stepwise: at 200° C. for two hours; to 400° C. in two hours; at 400° C. for two hours; to 600° C. in two hours; and, finally, at 600° C. for three hours. The calcined powder had a bulk density of 0.16 gm/cc. The mean particle size was 23 microns which is suitable for advanced ceramic materials.

EXAMPLE 8

This Example is similar to Example 7 except that only aluminum sec-butoxide was hydrolyzed. The density of the final calcined product was 0.15 gm/cc. The mean particle size was 20 microns. This alumina powder is useful as an advanced ceramic material.

The foregoing Examples illustrate certain embodiments of the present invention and, for that reason, should not be construed in a limiting sense. The scope of protection that is sought is set forth in the claims which follow.

I claim:

1. A process for forming metal oxide powders useful in forming plasma spray coatings which comprises dissolving a metal alkoxide in a, rather than polar, organic solvent, adding water and then emulsifying the blend of water and non-polar organic solvent containing the metal alkoxide dissolved in the emulsion thus formed to cause hydrolysis of the alkoxide with formation of the metal oxide as a precipitate, and recovering the metal oxide precipitate.

2. A process as claimed in claim 1 wherein a carboxylic acid is added to the solvent containing the metal alkoxide.

3. A process as claimed in claim 1 wherein a non-ionic surfactant agent is present in the blend of water and solvent.

4. A process as claimed in claim 1 wherein the metal alkoxide is a mixture of the alkoxides of zirconium and yttrium.

5. A process as claimed in claim 4 wherein the metal alkoxide ratio for zirconium is from 60–98% wt, as expressed as $ZrO_2$, and for yttrium is from 40-2%, as expressed as $Y_2O_3$.

6. A process as claimed in claim 1 wherein the metal alkoxide is a mixture of the alkoxides of aluminum, zirconium and yttrium.

7. A process as claimed in claim 6 wherein the metal alkoxide ratio for aluminum is about 60-98% wt, expressed as $Al_2O_3$, for zirconium is about 40-2% wt, expressed as $ZrO_2$, and for yttrium is about 10-0.2%, expressed as $Y_2O_3$.

* * * * *

UNITED STATES PATENT AND TRADEMARK OFFICE
CERTIFICATE OF CORRECTION

PATENT NO. : 5,023,071
DATED : June 11, 1991
INVENTOR(S) : Fawzy G. Sherif

It is certified that error appears in the above-identified patent and that said Letters Patent is hereby corrected as shown below:

Column 4, line 51,
Claim 1, line 3, insert -- non-polar -- after "in a".

Signed and Sealed this

Thirtieth Day of March, 1993

Attest:

STEPHEN G. KUNIN

*Attesting Officer*         *Acting Commissioner of Patents and Trademarks*